United States Patent [19]
Ippolito et al.

[11] Patent Number: 6,045,050
[45] Date of Patent: Apr. 4, 2000

[54] PREPAID OR STORED-VALUE CARD WITH MEANS FOR PREVENTING USEFUL FRAUDULENT ALTERATION

[75] Inventors: Giovanni Ippolito, Milan; Gianluca Colombo, Borgoticino, both of Italy

[73] Assignee: Alfi S.r.l., Borgoticino, Italy

[21] Appl. No.: 09/017,153

[22] Filed: Feb. 2, 1998

[30] Foreign Application Priority Data

Feb. 7, 1997 [IT] Italy ................................ MI97A0259

[51] Int. Cl.⁷ .................................................. G06K 19/06
[52] U.S. Cl. ............................ 235/492; 902/26; 235/379
[58] Field of Search .................................. 235/379, 380, 235/492, 493; 902/25, 26, 27, 28

[56] References Cited

U.S. PATENT DOCUMENTS

| | | | |
|---|---|---|---|
| 3,653,480 | 4/1972 | Yamamoto et al. | 194/210 |
| 4,780,602 | 10/1988 | Kawana et al. | 235/380 |
| 5,030,806 | 7/1991 | Collin | 235/492 X |
| 5,216,419 | 6/1993 | Fujisaka et al. | 235/375 X |
| 5,504,701 | 4/1996 | Takahashi et al. | 235/492 X |
| 5,521,362 | 5/1996 | Powers | 235/380 |
| 5,536,923 | 7/1996 | Foglino | 235/380 |
| 5,811,771 | 9/1998 | Dethloff | 235/380 |
| 5,884,292 | 3/1999 | Baker et al. | 705/403 |
| 5,889,266 | 3/1999 | Schrenk | 235/380 |

FOREIGN PATENT DOCUMENTS 62-139074   6/1987   Japan .

*Primary Examiner*—Michael G Lee
*Assistant Examiner*—Jared J. Fureman
*Attorney, Agent, or Firm*—Guido Modiano; Albert Josif; Daniel O'Byrne

[57] ABSTRACT

A prepaid card with elements for preventing useful fraudulent alteration, comprising, on a supporting element, at least one electrically rewritable permanent register, at least one temporary register and at least one control element for comparison between a usable value that is present in the at least one permanent register and a new value which is temporarily provided in the at least one temporary register. The control element is suitable to allow to write the new value in the permanent register in replacement of the usable value only if the new value is smaller than the usable value.

10 Claims, 1 Drawing Sheet

U.S. Patent  Apr. 4, 2000  6,045,050
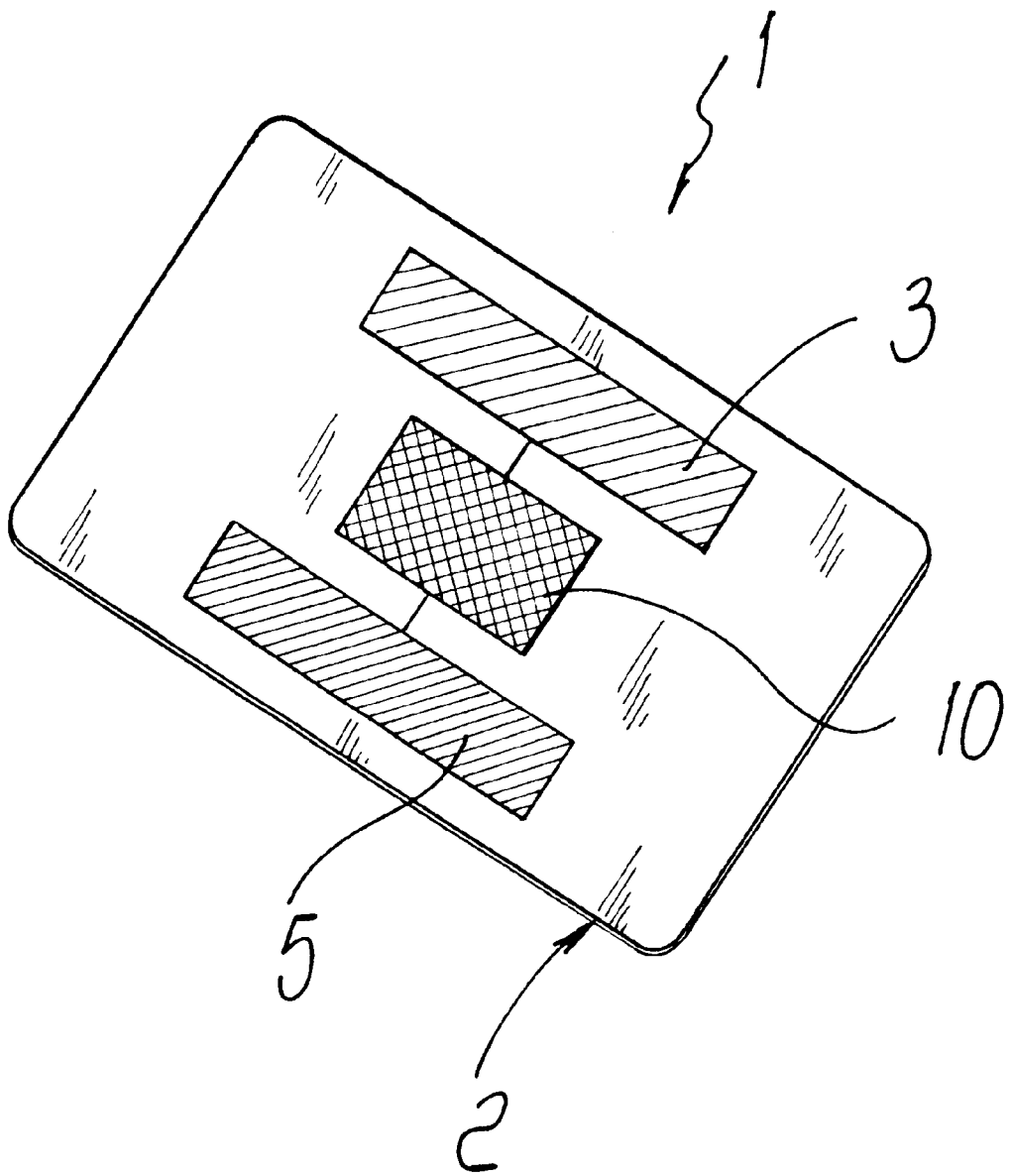

PREPAID OR STORED-VALUE CARD WITH MEANS FOR PREVENTING USEFUL FRAUDULENT ALTERATION

BACKGROUND OF THE INVENTION

The present invention relates to a prepaid or stored-value card with means for preventing useful fraudulent alteration.

It is known that prepaid cards of the magnetic type are already commercially available and are used for example for highway tolls, telephone services and so forth; their security is rather limited, since the card can be altered easily by anyone who has the equipment required to read/write the card.

Other conventional cards, such as for example chip-cards, have a built-in microprocessor and their security is entrusted to a plurality of authentications of various kinds which are performed directly by the microprocessor by means of a specific program contained therein. Those chip-cards have a good security degree, but their limitation is their relatively high cost.

Chip-cards without a microprocessor, such as for example the Siemens SLC443 card, are also known. Those cards have a five-stage octal counter which cannot be reloaded after its first activation and entail considerable limitations for applications outside the domain of telephony, since they have a counter in which each operation entails deducting one unit at a time; accordingly, it is unacceptable to use it if large unit values must be deducted because the system is extremely slow.

Moreover, this type of card has an operating limitation because after an average of 20–30,000 operations the card is physically no longer usable.

Other known solutions provide transponders for remote reading which have a low-cost EEPROM memory whose content can be read and rewritten freely, optionally by using suitable passwords, such as for example the TIRIS MPT16 transponders by Texas Instruments. This technology, however, currently has the limitation that it is not possible to write data related to a consumption of units in a manner that cannot be altered.

SUMMARY OF THE INVENTION

The aim of the present invention is to solve the above problems by providing a prepaid or stored-value card which does not have a built-in microprocessor and allows to have a very high security degree, preventing any fraudulent alteration that might be useful.

Within the scope of this aim, a particular object of the present invention is to provide a prepaid or stored-value card which allows to perform operations in a short time by virtue of the fact that it is possible to deduct an arbitrary number of units in each individual instance, thus providing a card life cycle which allows to perform a very large number of operations.

Another object of the present invention is to provide a prepaid and stored-value card which is extremely practical and versatile in use as well as highly reliable.

Another object of the present invention is to provide a prepaid or stored-value card which can be easily obtained starting from commonly commercially available elements, technologies and materials and is also competitive from a merely economical point of view.

This aim, these objects and others which will become apparent hereinafter are achieved by a prepaid card with means for preventing useful fraudulent alteration, according to the invention, characterized in that it comprises, on a supporting element, at least one electrically rewritable permanent register, at least one temporary register and at least one control element for comparison between a usable value that is present in said at least one permanent register and a new value which is temporarily provided in said at least one temporary register, said at least one control element being suitable to allow to write said new value in said at least one permanent register in replacement of said usable value only if said new value is smaller than said usable value.

BRIEF DESCRIPTION OF THE DRAWINGS

Further characteristics and advantages of the present invention will become apparent from the following detailed description of a preferred but not exclusive embodiment of a prepaid or stored-value card with means for preventing useful fraudulent alteration, illustrated only by way of non-limitative example in the accompanying drawings, wherein the only figure is a schematic view of a card according to the present invention.

DESCRIPTION OF THE PREFERRED EMBODIMENTS

With reference to the above figure, the prepaid or stored-value card with means for preventing useful fraudulent alteration, according to the present invention, generally designated by the reference numeral 1, comprises a supporting element 2 on which at least one permanent register 3 is provided which is advantageously but not necessarily implemented with EEPROM technology and can also be divided into a plurality of areas, such as for example 8-byte areas.

On the card there is also provided at least one temporary register, designated by the reference numeral 5, which can be advantageously implemented with (S)RAM technology (flip-flop) or with EEPROM technology.

There is also a control element 10 substantially provided by means of a comparator and having the purpose of comparing a value that is present in the permanent register 3 and a new value that is temporarily provided in the temporary register. Considering, by way of example, a prepaid card, the control element 10 in practice has the purpose of allowing the new value that is provided in the temporary register 5 to be placed in the rewritable permanent register 3 in replacement of the usable value only if said value is lower than the value present in the permanent register 3.

Conversely, in the case of a stored-value card, the control element 10 has the purpose of allowing the new value provided in the temporary register 5 to be written in the permanent register 3 in replacement of the used value only if said new value is higher than the used value.

Substantially, the control element 10, which is not a microprocessor, supervises the execution of the operations on the card and communicates, by means of a channel which is typically serial, with an external terminal capable of reading and writing the card.

In this manner, both in the case of a prepaid card and in the case of a stored-value card, it is not possible to fraudulently change the value in a useful way, since the comparator 10 in practice allows to rewrite a value in the permanent register 3 only if said value is smaller than the preceding one, in the case of a prepaid card, or higher than the preceding one in the case of a stored-value card; accordingly, interest in performing fraud is eliminated.

The control element 10 in fact allows the terminal to freely read the prepaid or stored-value registers but allows rewriting of a new value only if the new value to be rewritten is respectively lower or higher than the value that is already present.

It should also be noted that owing to the limitations normally entailed by EEPROM technology, it is physically necessary to divide the rewriting operation into two atomic and separate operations, i.e., an operation for deleting the previous content and an operation for rewriting the new value. Accordingly, the risk might arise of losing the content of the permanent register 3 if the operation is interrupted for any reason; therefore conventional protection criteria, such as for example the use of two registers, are used.

From the above description it is thus evident that the present invention achieves the intended aim and objects and in particular the fact is stressed that the card according to the invention is far more advantageous than chip-cards with a decremental counter, since it allows to rewrite a new value without counting unit by unit, as instead required by conventional cards, with the mentioned limitations in terms of operating slowness if considerable unit values must be deducted and most of all in terms of unacceptability of the system if the values to be deducted are very high.

Moreover, in addition to slowness, it should also be noted that the average life of an EEPROM cell is on the order of 100,000 operations. In known solutions, this limit entails a limited duration of the card; in the specific case, instead, it is not significant, since the operations are constituted by a single rewrite of the value instead of a unit-by-unit modification.

Use of a conventional counter device would also entail severe limitations to use in remote-reading technologies, owing to the considerable restrictions and limitations. Therefore, the card according to the present invention can be used also in the remote-reading field; this was not feasible in practice with conventional cards.

It should be added to the above that the constructive simplicity of the present invention, which is based in practice on the presence of a parallel comparator, for example of the 74 LS85 type or the like, or of a plurality of cascade-connected comparators, allows to perform a control which significantly reduces the operating times, since it is not necessary to perform unit-by-unit counting, and also provides a considerable reliability which prevents its forgery.

The invention thus conceived is susceptible of numerous modifications and variations, all of which are within the scope of the inventive concept.

All the details may also be replaced with other technically equivalent elements.

In practice, the materials employed, as well as the contingent shapes and the dimensions, may be any according to requirements.

What is claimed is:

1. A prepaid card with means for preventing useful fraudulent alteration, comprising, on a supporting element, at least one electrically rewritable permanent register, at least one temporary register and at least one control element for comparison between a usable value that is present in said at least one permanent register and a new value which is temporarily provided in said at least one temporary register, said at least one control element being suitable to allow to write said new value in said at least one permanent register in replacement of said usable value only if said new value is smaller than said usable value.

2. A card according to claim 1, wherein said electrically rewritable permanent register is constituted by an EEPROM.

3. A card according to claim 1, wherein said temporary register is implemented with (S)RAM technology.

4. A card according to claim 1, wherein said temporary register is constituted by an EEPROM.

5. A card according to claim 1, wherein said at least one control element is constituted by at least one comparator.

6. A stored-value card with means for preventing useful fraudulent alteration, comprising, on a supporting element, at least one electrically rewritable permanent register, at least one temporary register and at least one control element for comparison between an old value that is present in said at least one permanent register and a new value which is temporarily provided in said at least one temporary register, said at least one control element being suitable to allow to write said new value in said at least one permanent register in replacement of said old value only if said new value is greater than said old value.

7. A card according to claim 6, wherein said electrically rewritable permanent register is constituted by an EEPROM.

8. A card according to claim 6, wherein said temporary register is implemented with (S)RAM technology.

9. A card according to claim 6, wherein said temporary register is constituted by an EEPROM.

10. A card according to claim 6, wherein said at least one control element is constituted by at least one comparator.

* * * * *